(12) United States Patent
Kleinstück

(10) Patent No.: US 9,327,684 B2
(45) Date of Patent: May 3, 2016

(54) WARNING OF DANGER OF UNAUTHORIZED ACCESS TO A PARKED VEHICLE

(71) Applicant: GM GLOBAL TECHNOLOGY OPERATIONS LLC, Detroit, MI (US)

(72) Inventor: Lutz Kleinstück, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

(21) Appl. No.: 14/084,179

(22) Filed: Nov. 19, 2013

(65) Prior Publication Data

US 2014/0139330 A1    May 22, 2014

(30) Foreign Application Priority Data

Nov. 21, 2012   (DE) .......................... 10 2012 022791

(51) Int. Cl.
*B60R 25/10*   (2013.01)
*B60R 25/102*   (2013.01)

(52) U.S. Cl.
CPC .................................... *B60R 25/102* (2013.01)

(58) Field of Classification Search
CPC ...................................................... B60R 25/102
USPC ......................................... 340/426.1–426.28
See application file for complete search history.

(56) References Cited

U.S. PATENT DOCUMENTS 6,472,836 B1 * 10/2002 Uebelein et al. .............. 318/445
6,847,892 B2 * 1/2005 Zhou et al. .................... 701/408
7,053,499 B2   5/2006 Fischer
7,696,859 B2   4/2010 Teshima
8,093,998 B2   1/2012 Grossman
2001/0002815 A1 * 6/2001 Seto .............................. 340/426
2006/0208856 A1   9/2006 Nakashima
2007/0182526 A1 * 8/2007 Horii .......................... 340/426.1
2010/0117868 A1 * 5/2010 Van Wiemeersch et al. . 340/989
2011/0291823 A1 * 12/2011 Christensen et al. ...... 340/426.1
2012/0001745 A1 * 1/2012 Li ................................. 340/445

FOREIGN PATENT DOCUMENTS

| DE | 44 34 470 C1 | 4/1996 |
| DE | 199 23 701 A1 | 11/2000 |
| DE | 103 39 293 A1 | 3/2005 |
| DE | 10 2004 014 649 A1 | 10/2005 |
| JP | 2005-318335 A | 11/2005 |

* cited by examiner

*Primary Examiner* — Brent Swarthout
(74) *Attorney, Agent, or Firm* — John A. Miller; Miller IP Group, PLC

(57) ABSTRACT

The invention concerns a process and assistance system for warning of an unauthorized access to a parked vehicle. The process includes a first step for providing a communication as to whether the vehicle is at least partially unlocked. In a second step, in the case of an affirmative communication, the transmission of the current location of the vehicle takes place. In a third step, a comparison is made between the current location with at least one predetermined home location. In a fourth step, in the case in which the current location does not correspond with at least one home location, a wireless transmission of a warning signal to a mobile unit is given. In a fifth step, following the receipt of the warning signal by the mobile unit, a warning that is perceptible optically and/or acoustically and/or haptically is undertaken.

20 Claims, 2 Drawing Sheets

WARNING OF DANGER OF UNAUTHORIZED ACCESS TO A PARKED VEHICLE

Figure 1:
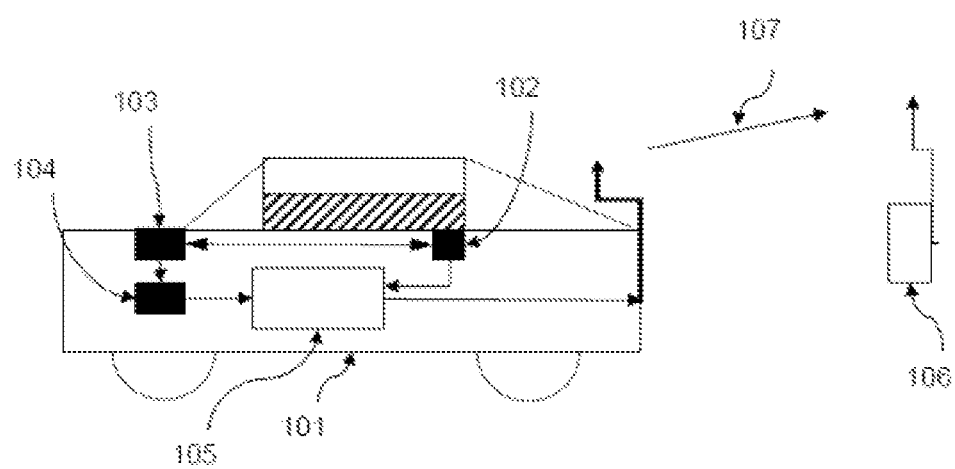

The invention concerns a process and a device for warning of danger of unauthorized access to a parked vehicle. The invention furthermore concerns a vehicle with just such a device.

Burglary and anti-theft alarms, which indicate a current unauthorized access to a vehicle by means of location sensors or by ultrasound or infrared interior monitoring, are sufficiently known in the state of the art. Typically, these sensors are automatically activated when the vehicle is parked. In the case in which the sensors detect an unauthorized access to the vehicle, acoustic and/or optical signals are sent out, which should direct the attention of surrounding passers-by to the vehicle and prevent the unauthorized access.

The purpose of the invention is that of indicating a process and a device with which a vehicle user can be warned of the danger of unauthorized access to a parked vehicle in the run-up to such a possible access.

The invention stems from the features of the independent Claims. Advantageous further developments and arrangements are the object of the independent Claims. Further features, application possibilities and advantages of the invention can be deduced for the description below, as well as from the explanation of the embodiments of the invention which are represented in the Figures.

A first aspect of the purpose according to the process is solved by means of a process for the warning of danger of unauthorized access to a parked vehicle. The process according to the invention comprises the following steps. In a first step, a determination is made as to whether the (parked) vehicle is at least partially unlocked. In a second step, in the case of affirmation of the unlocked state, a determination is made of the current location of the vehicle. In a third step, a comparison is made between the current location and at least one predetermined home location. In a forth step, in the event in which the current location does not correspond to at least one home location, a warning signal is then transmitted wirelessly to a mobile unit. In a fifth step, following the receipt of the warning signal by the mobile unit, a warning is issued by the mobile unit that can be perceived optically and/or acoustically and/or haptically.

The invention is furthermore based upon the recognition that a significant percentage of unauthorized accesses to vehicles (this whether it involves the theft of the complete vehicle, or only a part thereof, or luggage etc. . . . ) are brought about when the vehicle user neglects to fully lock up the vehicle when parking or alternatively leaving the vehicle.

Nowadays, the term "partially unlocked" is widely understood. A vehicle is accordingly partially unlocked when determined equipment of the vehicle, such as the vehicle doors, the gas filler cap, the trunk lid, the hood, the sunroof, the side windows are not in a closed and locked condition. A convertible vehicle can likewise be deemed to be partially unlocked when the convertible folding top is not closed and lock. In other words, a vehicle can be deemed to be partially unlocked at all times in which it is not fully closed.

In the first step, the locked condition of the vehicle is communicated. In the event in which at least one of the predetermined elements of equipment (windows, doors . . . ) transmits that it is not in a closed or locked condition, then the vehicle is at least partially unlocked. It is only in the event in which such an unlocked condition is communicated that in a second step, the current location of the vehicle is transmitted, for example, by means of a location determination system (GPS, Galileo, GLONASS, etc.). This current location is then compared in the third step to at least one of the predetermined home locations of the vehicle. The home location(s) preferably indicate one or multiple locations where the vehicle is safe, even if it is parked in an unlocked state, for example, the location of the home garage of the vehicle owner or the location of a guarded company parking lot, etc. . . . . . When the comparison is undertaken, it is preferable that a comparison be made as to whether the current location is in the vicinity of a home location, for example in a radius of 2 meters, 5 meters, or 100 meters, so as to also consider various possible safe parking places, for example, other parking spaces in a guarded company parking lot. In the fourth step, a warning signal is wirelessly transmitted to a mobile unit in the case in which the current location does not correspond to the home location or alternatively to the predetermined area surrounding the home location. This is based upon the consideration that the vehicle is only safely parked in a partially unlocked condition at the home location/area surrounding the home location. In the event in which the current location of the partially unlocked vehicle differs from such home locations, it is deemed to be basically unsafe or alternatively it presupposes danger of an unauthorized access to the vehicle. In the fifth step, a corresponding notification is made the user of the mobile unit, which typically is the driver of the vehicle.

In a preferred embodiment of the process, the first step is only undertaken after a predetermined time following a parking of the vehicle. This predetermined time period is preferably selected in the range between 1 min and 10 min. It should not be too short, to allow short term unlocked parking of the vehicle without the issuance of a warning, or, for example, to be able to dispose of garbage in a collection site in a parking area. It should likewise not be selected as too long a period, so as to prevent a speedy access to the vehicle through third parties.

It is preferred to have the mobile unit set up in such a way that the indication of the warning will be repeated continuously until such time that the issued warning is acknowledged as having been received by means of a manual input to the mobile unit. The holder of the mobile unit is made aware of the partially unlocked vehicle by the warning that is issued. The holder can then either return to the vehicle and in person fully lock up the vehicle, or in accordance with an embodiment of the process, as a follow-up to the issuance of the warning, enable the transmission of a locking signal to the vehicle by means of a predetermined manual entry into the mobile unit, which upon receipt in the vehicle, brings about an automatic complete locking of the vehicle.

The term "parking of the vehicle" is most commonly defined through the removal of the key from the ignition of the vehicle or the removal of a radio key of the vehicle from the reception coverage area of the vehicle.

A mobile telephone, a portable computer, a tablet-PC or a smartphone are preferred as the mobile unit. The transmission of the warning signal, as well as the locking signal, preferably take place by means of a mobile telephone network (GMS, UMTS, LTE).

Both the vehicle, as well as the mobile unit, feature a corresponding transmitter/receiver unit for this purpose.

A second aspect of the purpose is solved in accordance with the device through an assistance system for a vehicle for warning of danger of unauthorized access to a parked vehicle. The assistance system in accordance with the invention comprises a first means, through which it can be determined whether the vehicle is at least partially unlocked, a second means, through which in the case of an affirmative communication in step one, a current location of the vehicle is determined, a third means, through which the current location is compared with a predetermined home location, and a fourth means, with which, in the case in which the current location does not correspond to at least one home location, a warning signal is transmitted wirelessly to a mobile unit, whereby following the receipt of the warning signal by the mobile unit, an optical and/or acoustic and/or haptic warning is issued.

It is preferable when the first means is set out in such a manner that the transmission as to whether the vehicle is at least partially unlocked is initially only carried out following a predetermined time period subsequent to the parking of the vehicle. It is furthermore preferable when the first means is combined with the central locking system of the vehicle. This allows for a simple determination of the locked condition of the vehicle.

It is preferable that the assistance system in accordance with the invention features a fifth means that is set up in such a way that it receives a locking signal that has been transmitted by the mobile unit, whereby a complete automatic locking of the vehicle is undertaken. It is preferred that the fifth means is combined with the central locking system of the vehicle.

Advantages and advantageous further developments occur from an analogous and corresponding transmission of executions made in accordance with the process according to the invention.

Lastly, the invention concerns a vehicle with the assistance system described here above.

Further advantages, features and particulars result from the following description of the embodiments that are described in reference to the drawings. Identical, similar and/or functionally equivalent parts are identified with the same references.

Figure 2:
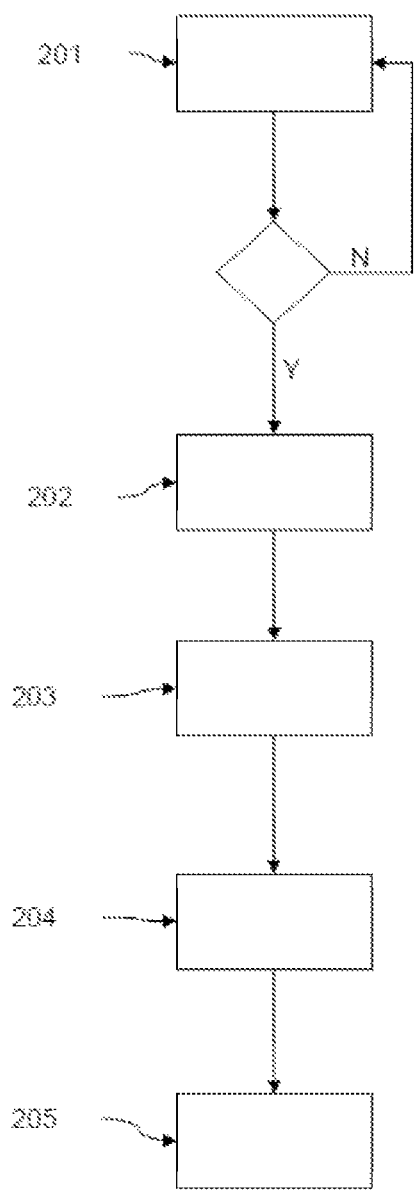

The Figures show the following:

FIG. 1 shows a schematic construction of an assistance system in accordance with the invention, and FIG. 2 shows a schematic construction plan of a process in accordance with the invention, and FIG. 1 shows a schematic construction of an assistance system in accordance with the invention for a vehicle 101 for warning of danger of unauthorized access to a parked vehicle 101, comprising: a first means 102, with which it is communicated whether the vehicle 101 is at least partially unlocked. In the case at hand, the right side window (designated with hatch marks) of the vehicle 101 is half-way open, in such a manner that the first means communicates a partially unlocked circumstance of the locking of the vehicle 101. Insofar as the vehicle 101 is therefore not fully locked, a current location of the vehicle 101 is therefore transmitted by the second means 103. The assistance system furthermore comprises a third means 104, with which the transmitted current location is compared with at least one predetermined home location, and a fourth means 105, with which, in the case in which the current location does not correspond to at least one home location, a warning signal 107 is transmitted wirelessly to a mobile unit 106, whereby, following receipt of the warning signal 106 by the mobile unit, a warning that can be perceived optically and/or acoustically and/or haptically is issued.

FIG. 2 shows a schematic construction plan of a process in accordance with the invention for the warning of danger of unauthorized access to a parked vehicle 101, with the following steps. In a first step 201 a communication takes place as to whether the vehicle 101 is at least partially unlocked. In a second step 202, in the case of an affirmative communication, a transmission of the current location of the vehicle 101 takes place. In a third step, a comparison of the current location of the vehicle is made with at least one of the predetermined home locations of the vehicle. In a fourth step 204, in the case in which the current location does not correspond to at least one of the predetermined home locations, a wireless transmission of a warning signal 107 is sent to a mobile unit 106. In a fifth step 205, the issuance of an optically and/or acoustically and/or haptically perceptible warning is sent out by the mobile unit 106, following the receipt of the warning signal in the mobile unit 106.

Notwithstanding that the invention is more closely illustrated and described in detail through preferred embodiments, it is nonetheless not limited by the disclosed examples and other variants can be deduced by the person skilled in the art, without straying from the scope of protection of the invention. It is therefore clear that a multitude of possible variants exist. It is likewise clear that the embodiments that have been named as examples actually only represent examples, which are not in any way to be deemed as being limitations as regards the scope of protection, the application possibilities or the configuration of the invention. On the contrary, the description and the drawing description place the person skilled in the art in the position to concretely implement the representative embodiments, whereby the person skilled in the art, with the knowledge of the disclosed invention teaching, will be able to undertake various changes, for example as regards the function or the arrangement of individual elements that are named in an exemplary embodiment, without straying from the scope of protection of the invention defined by the Claims and their legal equivalents, as might be defined in a further explanation in the description.

The invention claimed is:

1. A process for warning of a danger for unauthorized access to a parked vehicle, comprising:
   providing a communication that the vehicle is at least partially unlocked when any vehicle equipment consisting of doors, windows, gas filler cap, trunk lid, hood, sunroof and roof is not in a closed and locked condition,
   transmitting a current location of the vehicle in response to the communication that the vehicle is at least partially unlocked, said current location being a location where the vehicle has been parked,
   comparing the current location of the vehicle with at least one predetermined home location, said at least one home location being a location where the vehicle is considered to be safe and not considered in danger for unauthorized access,
   wirelessly transmitting a warning signal to a mobile unit if the current location is not the at least one home location, and
   upon receipt of the warning signal by the mobile unit, issuing by the mobile unit a warning that is perceptible optically, acoustically, haptically, or a combination thereof.

2. The process according to claim 1, wherein providing a communication is first carried out following a predetermined time period after parking of the vehicle.

3. The process according to claim 2, wherein the predetermined time period is selected from within the range of 1 min to 10 min.

4. The process according to claim 1, further comprising resending the warning signal in the event that the warning signal has not been acknowledged by a manual input being made to the mobile unit.

5. The process according to claim 1, wherein the vehicle is considered parked if an ignition key is removed from the vehicle or a radio key is removed from the vehicle from a reception coverage area of the vehicle.

6. The process according to claim 1, wherein the mobile unit is a mobile telephone or a mobile computer.

7. The process according to claim 1, further comprising transmitting a locking signal to the vehicle, which upon receipt in the vehicle brings about a complete automatic locking of the vehicle being enabled by a predetermined manual input in the mobile unit following the issuance of the warning.

8. An assistance system that includes a processor programmed for warning of a danger for an unauthorized access to a parked vehicle, comprising:
- first means for communicating that the vehicle is at least partially unlocked when any vehicle equipment consisting of doors, windows, gas filler cap, trunk lid, hood, sunroof and roof is not in a closed and locked condition,
- second means for transmitting a current location of the vehicle if the vehicle is at least partially unlocked, said current location being a location where the vehicle has been parked,
- third means for comparing the current location of the vehicle with at least one predetermined home location, said at least one predetermined home location being a location where the vehicle is considered to be safe and not considered in danger for unauthorized access, and
- fourth means for wirelessly transmitting a warning signal to a mobile unit if the current location is not the at least one predetermined home location, whereby subsequent to the receipt of the warning signal by the mobile unit, a warning that is perceptible optically, acoustically, haptically, or a combination thereof, is transmitted by the mobile unit.

9. The assistance system according to claim 8, wherein the first means is set up in such a manner that the transmission as to whether the vehicle is at least partially unlocked will only first be undertaken after a predetermined time period following the parking of the vehicle.

10. The assistance system according to claim 8, wherein the first means is connected with a central locking system of the vehicle.

11. The assistance system according to claim 8 further comprising a fifth means for allowing the mobile unit to transmit a locking signal, which brings about the automatic locking of the vehicle following receipt of the locking signal.

12. The assistance system according to claim 11, wherein the fifth means is connected with a central locking system of the vehicle.

13. A method for warning of a danger for unauthorized access to a vehicle comprising providing an assistance system that is programmed for communicating that the vehicle is at least partially unlocked when any vehicle equipment consisting of doors, windows, gas filler cap, trunk lid, hood, sunroof and roof is not in a closed and locked condition, transmitting a current location of the vehicle if the vehicle is at least partially unlocked, said current location being a location where the vehicle has been parked, comparing the current location of the vehicle with at least one predetermined home location, said at least one predetermined home location being a location where the vehicle is considered to be safe and not considered in danger for unauthorized access, and wirelessly transmitting a warning signal to a mobile unit if the current location is not the at least one predetermined home location, whereby subsequent to the receipt of the warning signal by the mobile unit, a warning that is perceptible optically, acoustically, haptically, or a combination thereof, is transmitted by the mobile unit.

14. The method according to claim 13, wherein the assistance system is set up in such a manner that the transmission as to whether the vehicle is at least partially unlocked will only first be undertaken after a predetermined time period following the parking of the vehicle.

15. The method according to claim 13, wherein the assistance system is connected with a central locking system of the vehicle.

16. The method according to claim 13 further comprising allowing the mobile unit to transmit a locking signal which brings about the automatic locking of the vehicle following receipt of the locking signal.

17. The method according to claim 16, wherein the mobile unit is connected with a central locking system of the vehicle.

18. The process according to claim 1, wherein the at least one predetermined home location includes one or more of a home garage of a vehicle owner, a guarded company parking lot, or a vicinity of the home garage that is within a predetermined radius.

19. The assistance system according to claim 8, wherein the at least one predetermined home location includes one or more of a home garage of a vehicle owner, a guarded company parking lot, or a vicinity of the home garage that is within a predetermined radius.

20. The method according to claim 13, wherein the at least one predetermined home location includes one or more of a home garage of a vehicle owner, a guarded company parking lot, or a vicinity of the home garage that is within a predetermined radius.

* * * * *